Feb. 12, 1924.　　　　　　　　　　　　　　1,483,817
A. H. LANDRY
GEAR WHEEL
Filed Oct. 2, 1923
Fig.1,　　　　　　　　Fig.2,
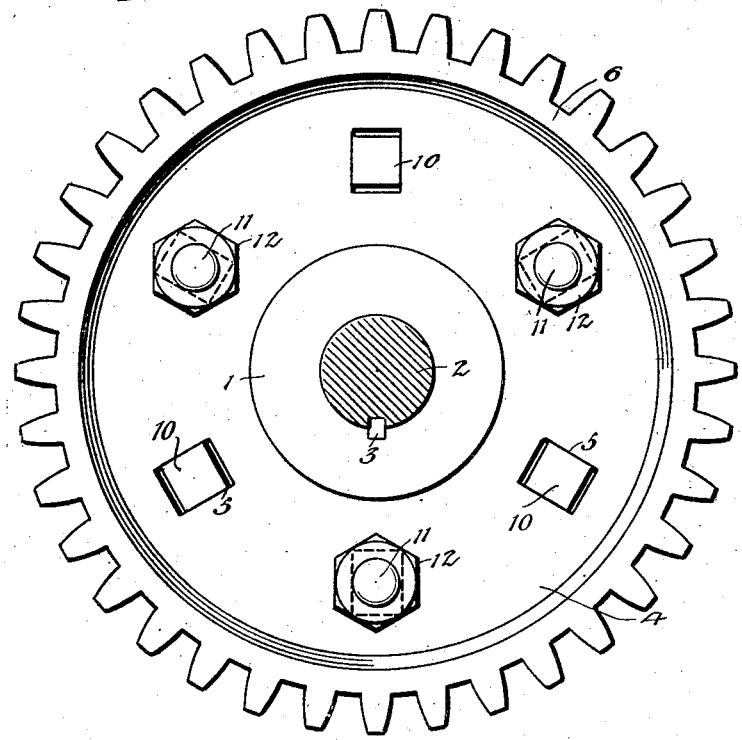
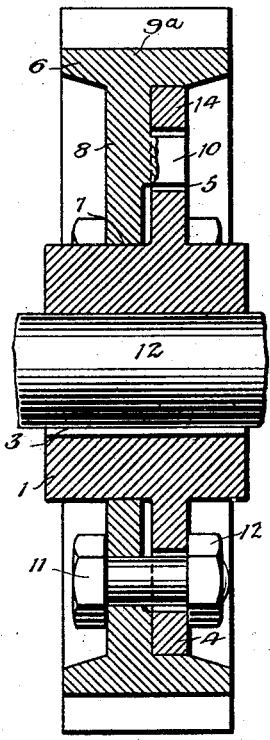
Fig.3,　　　　　　　　Fig.4.
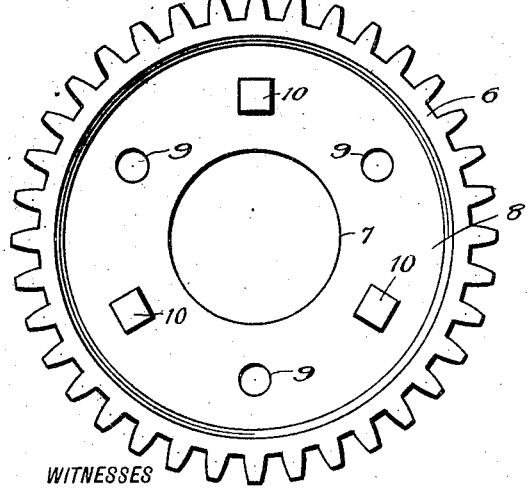
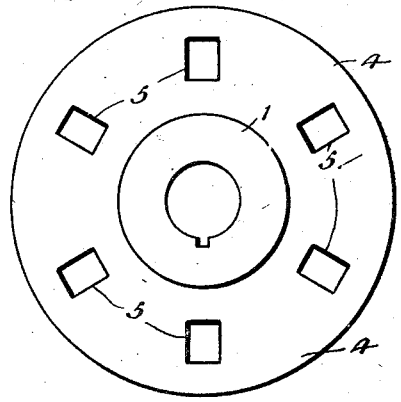
WITNESSES  
Edw. Thorpe  
S. W. Foster
INVENTOR  
Adolphus H. Landry  
BY  
ATTORNEYS Patented Feb. 12, 1924.

1,483,817

UNITED STATES PATENT OFFICE.

ADOLPHUS HENRY LANDRY, OF TOWNSEND, MASSACHUSETTS.

GEAR WHEEL.

Application filed October 2, 1923. Serial No. 666,149.

*To all whom it may concern:*

Be it known that I, ADOLPHUS H. LANDRY, a citizen of the United States, and a resident of Townsend, in the county of Middlesex and State of Massachusetts, have invented a new and Improved Gear Wheel.

This invention relates to improvements in gear wheels, and more particularly to gear wheels capable of repair and adjustment and primarily adapted for use in connection with looms, although the invention is of course, not limited to the use of the gear, as it is adapted for a wide range of utility.

An object of the invention is to provide a gear wheel having a separable hub to which the gear wheel is rigidly secured, but capable of a large number of adjustments relative to the hub and a fixed relation to the hub, so that different portions of the gear wheel can be presented for maximum wear and the life of the gear lengthened to the maximum.

With these and other objects in view, the invention consists in certain novel features of construction and combinations, an arrangement of parts, as will be more fully hereinafter described and pointed out in the claims.

In the accompanying drawings—

Figure 1 is a view in side elevation illustrating my improved gear fixed to the hub.

Figure 2 is a view in transverse section of the gear and hub.

Figure 3 is a view in side elevation of the gear.

Figure 4 is a view in side elevation of the hub.

Referring to the drawings, 1 represents a cylindrical hub which may be secured to a shaft 2 by means of a key 3 or other forms of attaching means.

This hub 2 is made with an annular web 4, the latter provided with a circular series of rectangular openings 5. While I have shown the web 4 as having six of these openings 5 which I believe to be a preferable number, it is obvious that the invention is not limited to the particular number of said openings.

6 represents my improved gear wheel perse, having a central opening 7 in its web portion 8 and provided in its web portion with a plurality (preferably 3) circular bolt receiving openings 9 and a like number of angular lugs 10 formed integrally or fixed in any approved manner.

It will be noted particularly by reference to Figure 2 that the web portion 8 of the gear 6 is in a plane to one side of the center of the gear so that when the web 8 of the gear is located beside the web 4 of the hub, both of these webs will support the teeth carrying bead $9^a$ of the gear.

In assembling the parts the lugs 10 are positioned in certain of the openings 5 of web 6 and headed bolts 11 are projected through the openings 9 and through certain other of the openings 5 and secured by means of nuts 12.

It will thus be apparent that in the event of wear of one of the walls of one of the openings 5 by reason of the contact or engagement of the lugs 10 therewith, that the bolts 11 can be removed and the gear turned to enter the lugs 10 in others of the openings 5 so that a large number of relative adjustments, or coupling engagements, may be had between the gear and the hub to insure a long wearing life to the combination of parts. In all positions the bolts 11 operate to effectually clamp the gear and hub together but to permit of quick adjustment at the will of the operator.

Various slight changes might be made in the general form and arrangement of parts described without departing from my invention, and hence I do not limit myself to the precise detail set forth, but consider myself at liberty to make such changes and alterations as fairly fall within the spirit and scope of the appended claims.

I claim:

1. A device of the character described, comprising a hub and a gear, webs on said hub and gear located side by side, one of said webs having a plurality of openings therein, lugs on the other of said webs adapted to be positioned in any of said openings, and means of clamping the webs together.

2. A device of the character described, comprising a hub, a web on the hub having a circular series of angular openings therein, a web on the gear wheel located in a plane at one side of the center of the gear wheel and having a central opening receiving the hub, lugs on said web of the gear wheel adapted to be positioned in any of the openings in the hub web, said gear web having bolt openings therein, bolts projected through said bolt openings and through certain of the openings in the hub web, and nuts on said bolts.

ADOLPHUS HENRY LANDRY.